United States Patent [19]

Priese

[11] 4,203,460
[45] May 20, 1980

[54] BALL VALVE WITH COMPOUND CLOSURE MOVEMENT

[75] Inventor: Werner K. Priese, Barrington, Ill.
[73] Assignee: Hills-McCanna Company, Carpentersville, Ill.
[21] Appl. No.: 886,649
[22] Filed: Mar. 15, 1978
[51] Int. Cl.$^2$ .............................................. F16K 3/36
[52] U.S. Cl. ................... 137/240; 251/161; 251/164; 251/188
[58] Field of Search ....................... 137/238, 240, 241; 251/161, 164, 188, 315, 165

[56] References Cited

U.S. PATENT DOCUMENTS

| | | | |
|---|---|---|---|
| 1,848,369 | 3/1932 | Mohr | 251/164 |
| 1,949,191 | 2/1934 | Smolensky | 251/161 |
| 2,031,151 | 2/1936 | Eulberg | 137/240 X |
| 2,584,083 | 1/1952 | Wellett | 137/238 |
| 2,893,681 | 7/1959 | McNeal | 251/161 |
| 3,339,884 | 9/1967 | Smith | 251/161 |
| 3,588,042 | 6/1971 | Topp | 251/315 |
| 3,605,789 | 9/1971 | Graham | 137/240 |
| 3,948,284 | 4/1976 | Walworth | 137/238 |

Primary Examiner—Harold W. Weakley
Attorney, Agent, or Firm—Trexler, Wolters, Bushnell & Fosse, Ltd.

[57] ABSTRACT

A ball valve unit for providing a fluid tight seal between a rotary valve member and its sealing components when in an open or closed position and which is adapted to permit a decrease in the sealing force to allow operation of the valve between the open and closed position. Said unit includes a body which defines a valve chamber and a pair of passages having openings communicating with the valve chamber on opposite sides thereof. An annular seal support is disposed about each opening and includes a substantially flat annular seal support surface. The seal support surfaces converge along a line equidistant from the surfaces in a first direction. A rotary ball valve member having a through bore for connecting the passages when in an open position is contained within the valve chamber. A pair of seal rings are disposed between the rotary ball valve member and respective seal supports and include a substantially flat external surface engaging the seal support surfaces and an internal annular seal surface in intimate contact with the rotary valve member about respective ends of the valve bore. A rotary ball valve member moving or biasing means is adapted to move the rotary valve member in the first direction for tight fluid sealing engagement with the seal rings when the valve is open or closed and for moving the rotary ball valve member in a second direction opposite the first direction for decreasing the seal to allow the rotary valve member to be operated between the open and closed positions.

10 Claims, 6 Drawing Figures

BALL VALVE WITH COMPOUND CLOSURE MOVEMENT

BACKGROUND OF THE INVENTION

The present invention is generally directed to fluid valves and more particularly to an improved ball valve unit of the type which includes a rotary ball valve member.

Ball valves are well known in the art and generally include a body incorporating a valve chamber and at least a pair of passages communicating with the valve chamber, a spherically shaped rotary ball valve member having a through channel for connecting the passage together when in the open position, and a pair of seats on opposite sides of and engaged with the rotary valve member, between the valve and the body passages to provide a seating action. Such valves have been found to exhibit improved operating characteristics over other conventional forms of valves, such as plug valves. The improved operation of such ball valves is generally due to the fact that a uniform load results over the sealing area. This not only provides an effective seal, but also reduces wear on the sealing components over an extended period of use. Another factor owning to their improved operation is that as the fluid line pressure increases across the rotary valve, the sealing action of the sealing components is intensified. As a result of the foregoing, ball valves have been found to provide a generally all around better sealing action than other conventional forms of valves.

One form of ball valve which has found wide general acceptance is fully described and claimed in U.S. Pat. No. 3,168,279 which issued on Feb. 2, 1965 in the name of John Harry Anderson and Werner K. Priese and which is assigned to the assignee of the present invention. The ball valve there described and claimed include a generally spherically shaped rotary valve or ball member located within a valve chamber between a pair of annular seats which are arranged to form a sealing wedge in which the rotary valve is contained. It has been found that the seal resulting from the wedge-like action provides a very effective seal between the rotary valve and the seats and between the seats and the valve body. The foregoing ball valve has not only been proved to provide effective sealing, but also has been found to maintain effective sealing action over a long service life without adjustment being required to maintain optimum engagement of the valve ball with its coacting valve seats.

Although the ball valves of the prior art have proven worthy of commercial acceptance, there still remains room for improvement. For example, because the rotary valves must be rotated approximately 90 degrees between an open and closed position, less than maximum seal tightness normally must be maintained to allow the valve to be operated. As a result, it is therefore possible for the fluid products being controlled to flow into the valve chamber and critical seal areas between the rotary valve members and the valve sealing components when the valve is in fully open or fully closed position. Over a period of time, the fluid products may solidify, leaving trapped foreign particles or residue which may cause leakage through abrasion, erosion, and corrosion of the valve components in the critical seal areas or the deposits may preclude the opening or closing of the valve. Hence, there is a need for a ball valve wherein maximum seal tightness may be maintained between the rotary valve and the seal components when the valve is in the open or closed condition and wherein the seal tightness may be decreased to a point where the valve may be operated but not to such an extent that large clearances are occurring between the rotary valve member and the valve sealing components.

There are numerous applications for valves wherein it is essential that the fluids on opposite sides of the valves not be mixed when the valve is in the closed condition. One such application is found in the petroleum industry wherein a manifold is used in a piping system with both gasoline and kerosene being handled by the manifold. It is very important that the gasoline and kerosene not be intermittently mingled and traditionally, "block and bleed" valves have been used to prevent such inadvertent mixing. While conventional ball valves have generally been useful in this form of application, there is a resultant need for an improved ball valve to perform this function.

Valves also find considerable use in the food processing industry such as, for example, in the manufacture of candy products. In this application, a valve is called upon to control the flow of relatively hot syrup which will solidify when allowed to cool. A problem therefore exists with any type of ball valve because during closing, the liquid product will accumulate in the space about the rotary valve member and within the rotary valve member through channel. Subsequent cooling of the trapped product eventually results in solidification of the product and possible blockage within the valve. Hence, it is vitally important that a ball valve used in such an application be provided with a flushing system for flushing out the trapped product around the rotary valve member or for maintaining the product in the fluid state by a fluid circulating system.

Lastly, it is often desirable to detect when a valve is leaking. It is often necessary to be able to determine the extent of such a leak to form a basis for replacing the critical seal components. Hence, a ball valve to be used in various applications should be provided with a means by which a seal leak and the extent thereof may be detected.

It is therefore a general object of the present invention to provide a new and improved ball valve unit which is adapted to control the flow of various forms of fluids and in various forms of application.

It is a further object of the present invention to provide a ball valve unit which maintains a maximum tight seal when in the open or closed condition and which includes means for decreasing the seal tightness to an extent permitting easy operation of the valve between the open and closed condition but not to such an extent that large clearances are occurring between the rotary valve and the valve seal components.

It is a more specific object of the present invention to provide a ball valve unit which precludes foreign particles from being trapped in critical seal areas to avoid deleterious effects to the critical seal components such as abrasion, erosion, and corrosion to the ultimate end of extending the useful life of the valve without requiring replacement of seal components or adjustment.

It is a still further object of the present invention to provide such a ball valve unit which includes means for flushing the valve of fluid which solidifies upon cooling or for maintaining such fluids trapped in the valve chamber and in the rotary valve member through channel when in the closed position in the fluid state.

It is a more particular object of the present invention to provide a ball valve unit which precludes inadvertent mixing of the fluids on opposite sides of the valve and which provides a means by which seal leaks may be detected and the extent thereof determined.

The illustrated embodiment of the present invention provides a ball valve unit including a body means defining a valve chamber and a pair of passages having respective openings communicating with the valve chamber, seal support means comprising substantially flat annular surfaces about said passage openings with the surfaces converging in a first direction, and a single trunnion mounted rotary valve or ball means within said valve chamber including a through bore for connecting the passages when in an open position. The ball valve unit further comprises annular seal or seat means disposed between the seal support means and the rotary valve means for establishing a fluid seal therebetween and means for rotating the rotary valve between an open and closed position. The ball valve unit still further includes means coupled to the rotary valve or ball means for moving the rotary valve means in said first direction for increasing the seal between the rotary valve means and the annular seal means when the valve means is in the open or closed position, and for moving the rotary valve means in a second direction opposite the first direction for decreasing the seal to allow the rotary valve means to be rotated between the open and closed positions.

BRIEF DESCRIPTION OF THE DRAWINGS

The features of the present invention which are believed to be novel are set forth with particularity in the appended claims. The objects and further advantages thereof may best be understood by making reference to the following description and the accompanying drawings wherein like numerals identify like elements and wherein:

DESCRIPTION OF THE PREFERRED EMBODIMENT

Figure 1:
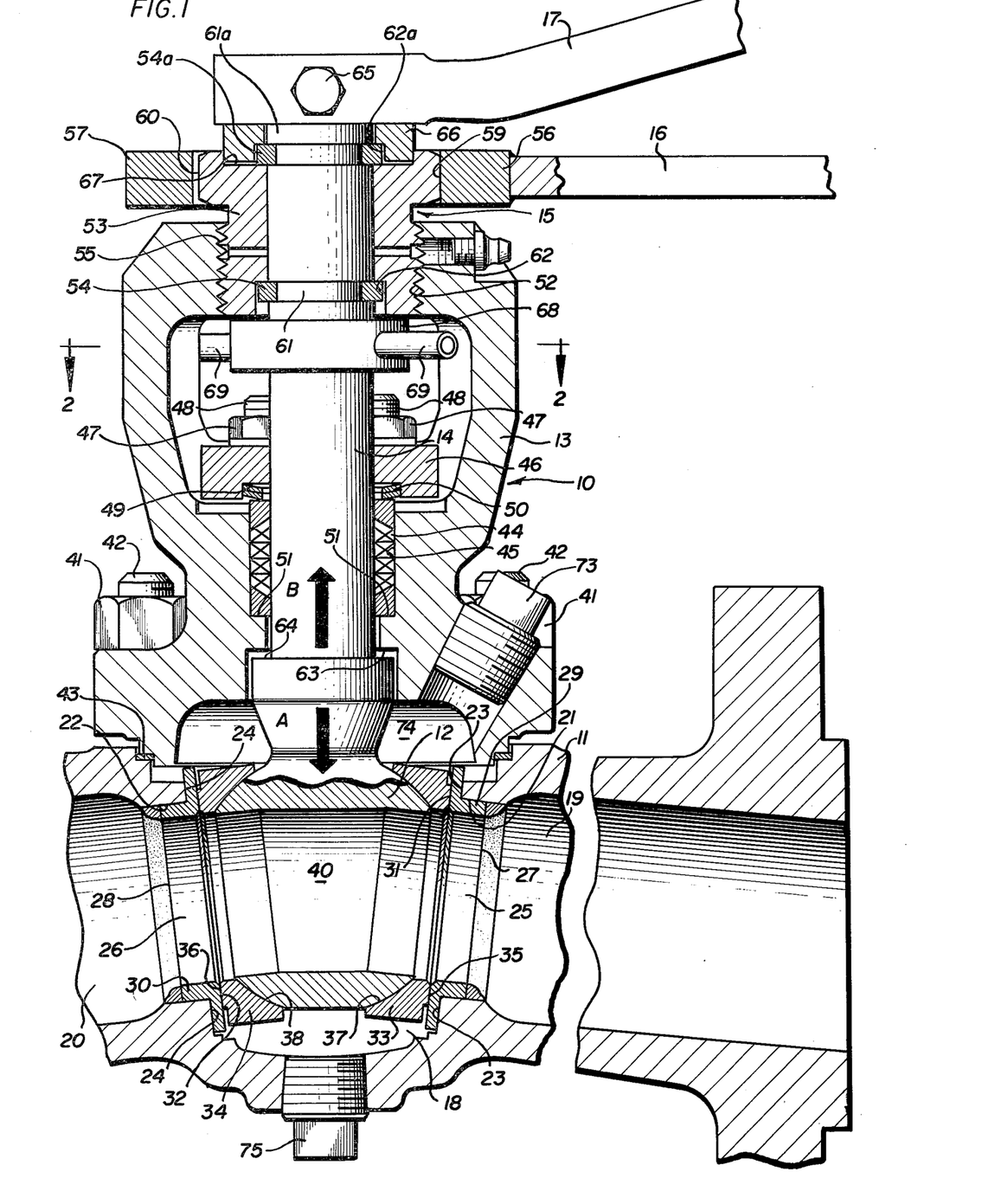
FIG. 1 is cross-sectional side view with portions broken away illustrating a ball valve unit embodying the present invention with the rotary valve thereof in the open position and arranged for maximum tight seal engagement with the seal components of the valve.

Referring now to FIG. 1, the ball valve unit 10 there illustrated generally includes a main body 11, a rotary valve or ball member 12, a cover or bonnet 13, a shaft or stem 14, a rotary valve or ball member moving means or assembly, designated generally 15, and a pair of operating arms or handles 16 and 17.

The main body 11 defines a valve chamber 18 in which the rotary valve or ball member 12 is contained. The body 11 also includes a pair of passages 19 and 20. The passages 19 and 20 define openings 21 and 22 respectively which communicate with the valve chamber 18 on opposite sides thereof. Opening 21 has a substantially flat annular surface 23, and similarly, opening 22 has a substantially flat annular surface 24. The substantially flat annular surfaces 23 and 24 are arranged to converge in a first direction along a line equidistant from the two surfaces toward the bottom of FIG. 1.

The openings 21 and 22 are dimensioned to receive seal support means 25 and 26 respectively. Seal support means 25 and 26 take the form of annular rings 27 and 28 respectively. Ring 27 includes a first portion 29 which is received by channel 21 and similarly, ring 28 includes a first portion 30 received by channel 22. Ring 27 also includes a substantially flat annular seal support surface 31 and similarly, ring 28 also includes a substantially flat annular seal support surface 32. Because the annular surfaces 23 and 24 of openings 21 and 22 respectively converge along a line equidistant between the two surfaces in a first direction towards the bottom of FIG. 1, the annular seal support surfaces 31 and 32 likewise converge in a similar manner. Seal support means 25 and 26 may be loosely inserted or pressed into channels 21 and 22 respectively or may be fastened to the valve body by other means known to the art like threading or welding.

The seal supports 25 and 26 may also be provided as integral parts of the body 11 or may be consisting of harder or more corrosion resistant material deposited onto the body 11 by welding or other known metal depositing methods.

Disposed between the rotary valve member 12 and the annular seal support surfaces 31 and 32 are a pair of annular sealing rings or seats 33 and 34. Each of the sealing rings or seats 33 and 34 includes a substantially flat annular rear surface 35 and 36 which abut the annular seal support surfaces 31 and 32 respectively. The sealing rings 33 and 34 also include an inner, generally spherical, sealing surface 37 and 38 which communicate with the outer surface of rotary valve or ball member 12 about the rotary valve member through bore 40 when the rotary valve member 12 is in its open position. When in this position, the rotary valve member 12 provides fluid communication between passages 19 and 20.

The body 11, rotary ball or valve member 12, and seal components just described provide a rotary valve structure which is very similar to the rotary valve structure shown and described in the aforementioned U.S. Pat. No. 3,168,279. Because the seal support annular surfaces 31 and 32 converge along a line equidistant between the two surfaces in a first direction (arrow A) towards the bottom of FIG. 1, force exerted on the ball member 12 in the direction "A" will produce a wedge-like sealing action, through which the sealing rings 33 and 34 will be urged into firm sealing engagement with the surface of ball member 12. As described in the aforementioned patent, the sealing rings may be formed from a somewhat yieldable material, or preferably from non-yieldable materials such as carbon graphite, ceramics or metals. As the rotary valve member 12 is moved in the first direction "A" towards the bottom of FIG. 1, the seal between the rotary valve member and the sealing rings and between the sealing rings and the seal support rings is increased. Conversely, as the rotary valve member 12 is moved in a second direction (arrow B) opposite the first direction, or in other words toward the top of FIG. 1, the sealing or biasing force between those previously mentioned components decreases.

It has been found that by moving the rotary valve member in the first direction "A" by a predetermined extent, a maximum type seal can be obtained between the rotary valve member and the various sealing components. However, in view of the resulting tight seal between those components, it will be difficult, if not impossible, to operate the rotary valve member 12 between its open position as shown in FIG. 1 to its closed position, FIG. 5. The present invention, as will be made clear subsequently, provides a means by which the rotary valve or ball member 12 may be moved in the second direction to a point which allows said rotary valve member 12 to be operated but not to such an extent that large clearances are occurring between the rotary valve and the other seal components. As also will be made clear subsequently, the rotary valve member 12 may be moved to provide an extremely tight seal with the sealing rings 33 and 34 and the other sealing components when the valve is in either the open or the closed condition. As such, the possibility of fluid product controlled by the valve following into the valve chamber or being trapped between the various critical sealing surfaces when the valve is in the fully open or the fully closed position, is materially reduced. To change the condition of the valve from either the open to the closed position or from the closed to opened position, an operator need only to raise the rotary valve or ball member 12 by a predetermined extent in the second direction "B" to loosen the seal, which allows the rotary valve member 12 to be rotated easily to the desired position. Furthermore, a slight contact between the rotary valve and the other seal components need not be lost during the operating transition, preventing that foreign matter which may be contained in the fluid, becomes trapped between the valve seal components.

Referring again to FIG. 1, the rotary valve or ball member 12 is carried by or coupled to the stem 14. While an integral type connection is illustrated, it is contemplated that the connection of the ball member 12 to the stem 14 may be effected by an articulated joint, such as a universal type connector, or the like. The stem 14 extends upwardly through the cover or bonnet 13. The stem 14, and thus the rotary valve member 12, as will be explained, are caused to move in the first and second directions "A" and "B" by the rotary valve member moving means or mechanism 15 acting in conjunction with the cover 13.

Figure 2:
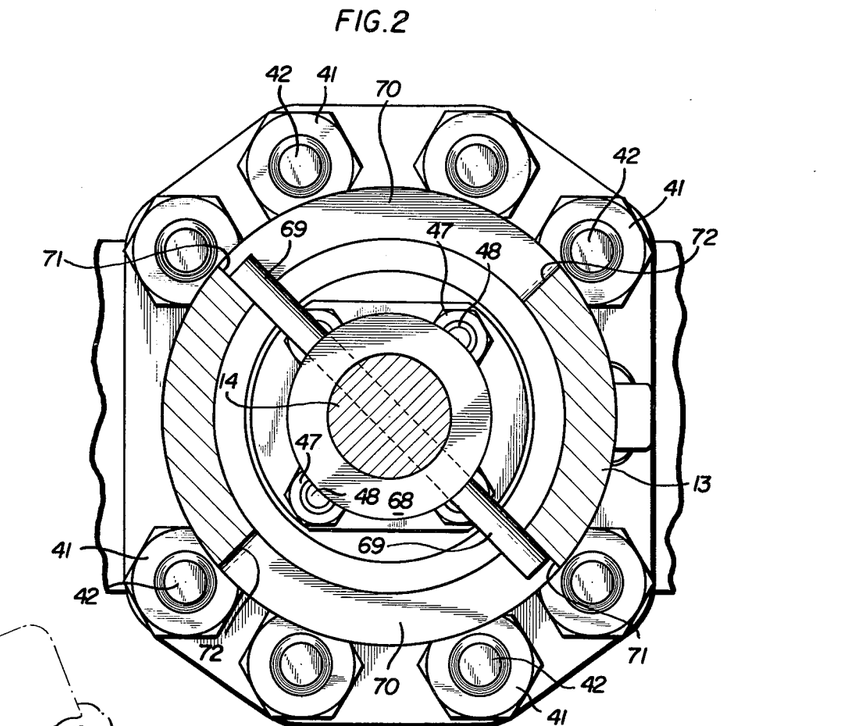
FIG. 2 is a cross-sectional view taken along line 2—2 of FIG. 1.

More specifically, cover 13 is secured to the body 11 by a plurality of nut fasteners 41 as shown in FIGS. 1 and 2 which are threaded onto suitable members 42 carried by the body 11. The interface between the body 11 and cover 13 is sealed by means of an annular gasket 43. A fluid seal between the stem 14 and the cover 13 is provided by a seal or packing assembly 44. The packing assembly 44 is of a known kind and is disposed about the stem 14 within a circumferential recess 45 of the cover 13 and thus can accommodate the previously mentioned linear movement of the stem 14. The packing assembly 45 is held in axial confinement relative to the stem 14 by a securing ring 46 which is bolted to the cover 13 by a plurality of nuts 47 threaded onto a corresponding plurality of threaded members 48 carried by the cover 13 as shown in FIGS. 1 and 2. The securing rings 46 include an annular recess 49 which receives a spring washer 50 which is loaded to bias the packing assembly 44 against an annular support surface 51 of the cover 13.

Figure 3:
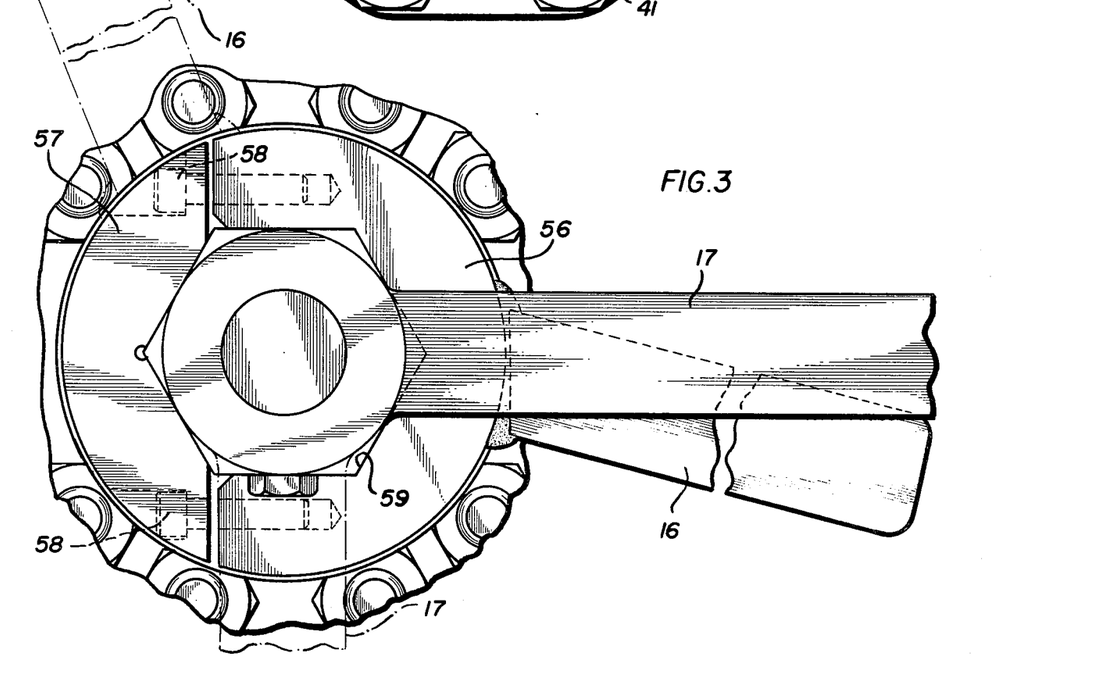
FIG. 3 is a top view of the ball valve unit of FIG. 1.

Attention is now directed to the preferred, illustrated form of the rotary valve member moving mechanism 15 which includes an internal thread 52 formed on the cover 13, an externally threaded gland nut 53 in engagement with the thread 52 on said cover, two split rings 54 and 54a joining the shaft 14 to the gland nut 53, and an operating arm 16 operatively coupled to said gland nut 53. The gland nut 53 includes an external thread 55 arranged to threadingly engage the internal thread 52 of cover 13. The operating arm 16, as best seen in FIG. 3, includes a segmented ring comprising a first ring segment 56 integral to arm 16 and a second ring segment 57. The second ring segment 57 is secured to the first ring segment 56 by a pair of bolts 58. The joined ring segments define an inner hexagonal opening 59 which is arranged to receive the hexagonal outer periphery 60 of the gland nut 53, thus permitting the relative position of handle 16 to be varied as desired. As a result, when the operating arm 16 is rotated, rotational movement is imparted to the gland nut 53. The rotation imparted to the gland nut 53 causes it to move in the first and second directions "A" or "B" through the cooperating engagement of the external thread 55 of the gland nut and the internal thread 52 of the cover. The gland nut 53 is coupled to the stem 14 by way of the two split rings 54 and 54a. The stem 14 includes circumferential slots 61 and 61a and the gland nut 53 includes an annular recess 62 which defines an annular space dimensioned for receiving the first split ring 54. A guide ring 66 includes an annular recess 62a which defines an annular space dimensioned for receiving the second split ring 54a. As a result of this structure, the stem 14 and gland nut 53 are axially interconnected with respect to one another, but are allowed to rotate independently with respect to one another.

Figure 4:
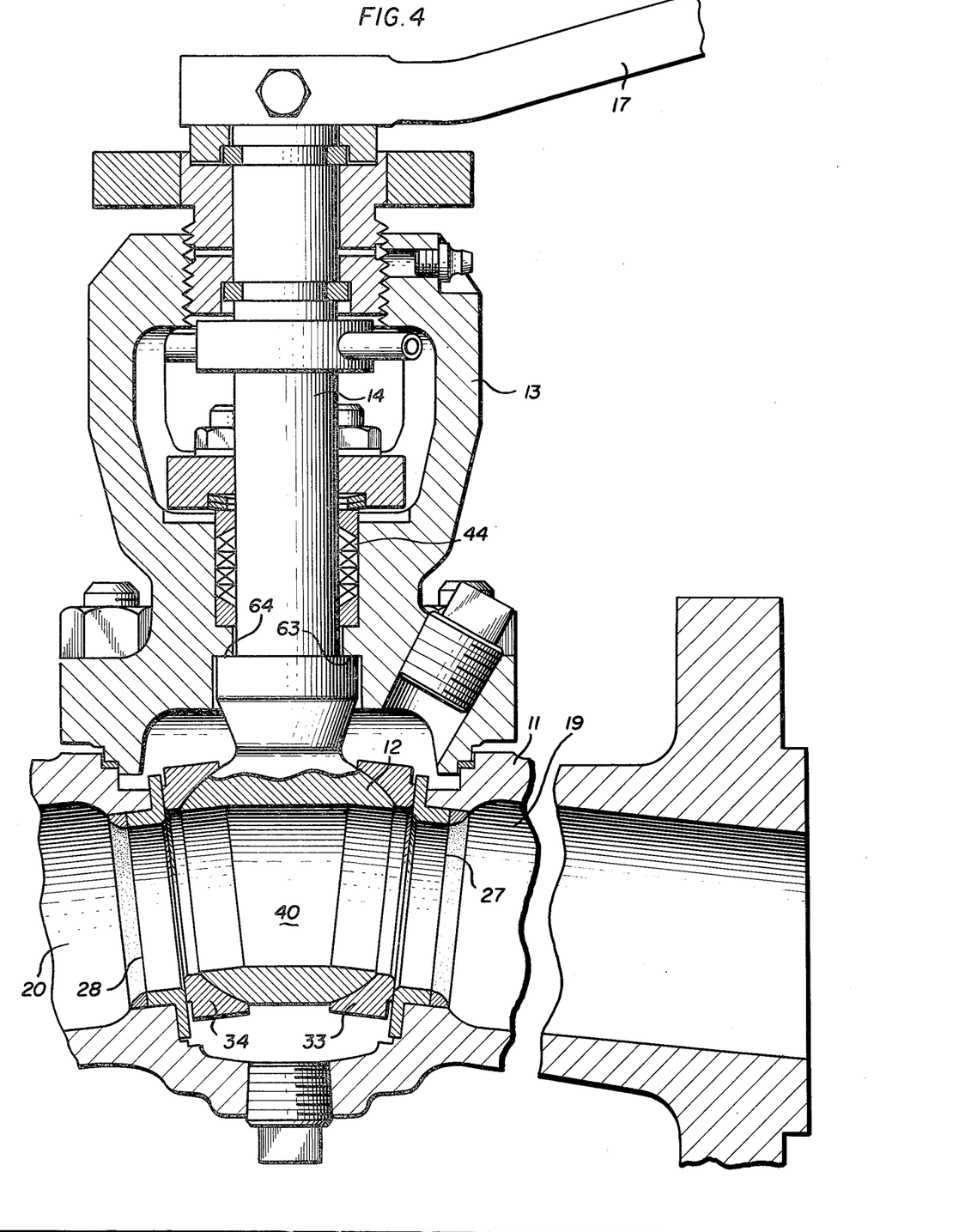
FIG. 4 is a cross-sectional side view with portions broken away similar to FIG. 1 but illustrating the rotary valve arranged for decreased seal engagement allowing operation of the valve unit.

As can be appreciated from the foregoing, the rotary valve member moving mechanism 15 is responsive to the application of a rotational force for imparting axial movement in the first and second directions "A" and "B" to the stem 14 and thus to the rotary valve member 12. Accordingly, by the selective operation of the mechanism 15 the sealing force provided by the wedging action of surfaces 31 and 32 may be increased or decreased as desired, and most advantageously, may be decreased to permit ease of operation, and increased when it is desired to provide maximum sealing action. As illustrated in FIG. 1, the rotary valve member 12 has been moved in the first direction "A" so that the rotary valve member 12 is in tight seal engagement with the sealing rings 33 and 34. FIG. 4 illustrates the ball valve unit after the rotary valve has been moved in the second direction "B" for the purposes of decreasing the seal engagement of the rotary valve member 12 with the sealing rings 33 and 34 to an extent permitting operation of the valve but not to such an extent as to create large clearances between the rotary valve member 12 and the sealing rings or seats 33 and 34. To assure that the rotary valve member is not moved in the second direction to a greater extent than necessary, the cover 13 includes an annular stop shoulder 63 which is arranged to abut an upwardly facing flange surface 64 of the stem 14. Hence, while the tight seal engagement of the rotary valve 12 and the sealing rings defines a first limit of movement of the rotary valve member in the first direction "A", the stop shoulder 63 of cover 13 and flange surface 64 of stem 14 define a second limit of movement for the rotary valve in the second direction "B". The second limit of movement in the second direction "B" can also be effected by other means external to the fluid chamber of the valve as will be explained later. FIG. 3 illustrates the rotational positions that the operating arm 16 may assume at each of the limits of travel in the first and second directions of the rotary valve member 12. The operating arm 16 shown in solid line in FIG. 3 is the position of the arm when the rotary valve 12 is at its first limit of travel and in tight sealing engagement with the annular sealing rings 33 and 34 as shown in FIG. 1. The operating arm 16 is shown in dashed lines in FIG. 3 at its position when the rotary valve 12 is at its second limit of travel in the second direction as shown in FIG. 4 for being in decreased sealing engagement with the sealing rings 33 and 34 to permit operation of the valve without creating large clearances between the rotary valve member 12 and the sealing rings.

Figure 5:
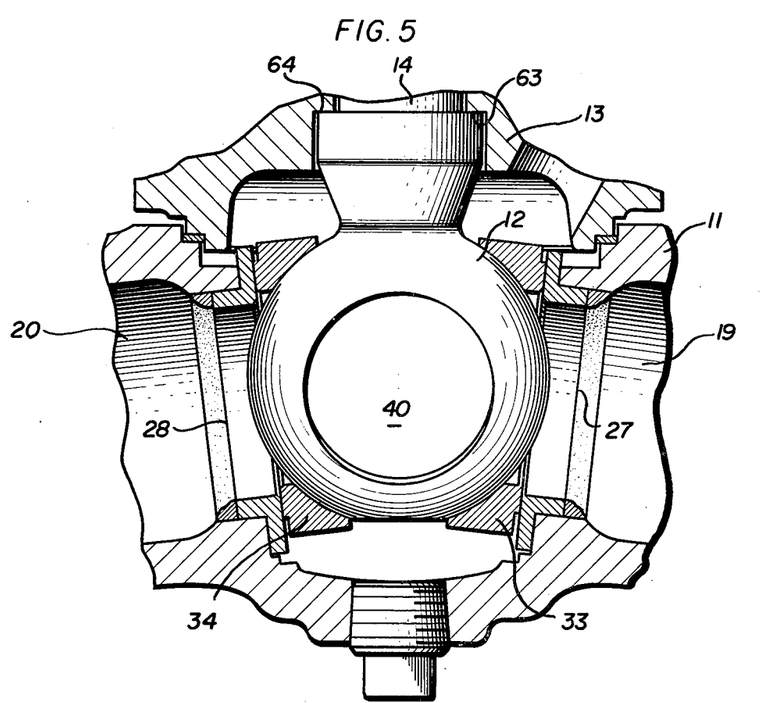
FIG. 5 is a partial cross-sectional side view illustrating the rotary valve in its closed position and arranged for decreased seal engagement allowing operation of the valve unit.
Figure 6:
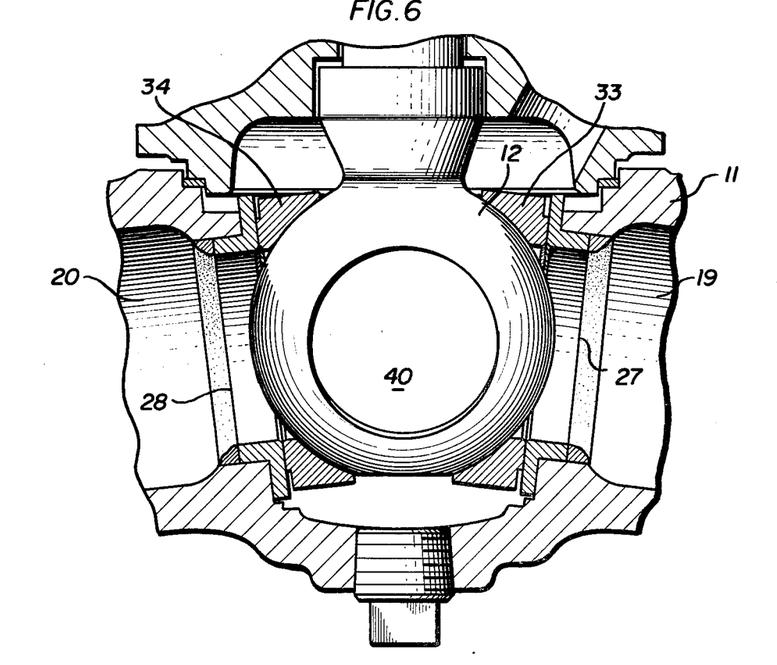
FIG. 6 is a partial cross-sectional side view similar to FIG. 5 but illustrating the rotary valve in its position for maximum seal engagement.

For operating the rotary valve between its open position as shown in FIGS. 1 and 4 and its closed position as shown in FIGS. 5 and 6, the ball valve unit includes the operating arm 17 which is secured to the stem 14 by a suitable bolt 65 and by a square on the stem or other suitable torque transmitting design means. A guide ring 66 is provided between operating arm 17 and gland nut 53 to keep the second split ring 54a in place. The guide ring is partially received within a circular cutout 67 of gland nut 53. Hence, assuming that the rotary valve 12 is at its second limit of travel in the second direction for decreased seal engagement with the sealing rings 33 and 34, smooth rotational movement is imparted to the rotary valve member and the stem 14 by rotation of operating arm 17. It shall be noted that the arm 17 can be rotated to operate the valve, only when the position of the arm 16 as shown in dotted outline in FIG. 3, is achieved. As discussed above, when arm 16 is in the full line position of FIG. 3, the rotary valve 12 is at its first limit of travel and in tight sealing engagement with rings 33 and 34.

The ball valve unit of FIG. 1 includes rotational stop means to provide first and second rotational limits for the rotary valve member 12 to assure that when at the first limit the rotary valve is open and when at the second limit, the rotary valve is completely closed. The rotational stop means may include a collar 68 carried by stem 14, a pin 69 and a pair of slotted portions 70 within the cover 13. The pin 69 extends radially outwardly from the stem 14 and is carried by the collar 68. The slotted portions 70 of the cover 13, as best seen in FIG. 2, cooperate with the pin 69 to define a limit of 90° rotation of the stem and rotary valve. As shown in FIG. 2, the pin 69 is engaged with a first pair of surfaces 71 defined by the slotted portions 70 which corresponds to the first limit of rotational movement of the stem 14 and rotary valve member 12. At this rotational limit, the rotary valve member 12 is open as shown in FIGS. 1 and 4.

When the operating arm 17 is rotated in a clockwise direction through an arc of approximately 90°, the pin 69 will engage surfaces 72 and the rotary valve will be closed as shown in FIGS. 5 and 6. When in the closed position as illustrated, the through bore 40 of the rotary valve 12 will be approximately at right angles to the first and second passages 19 and 20 of the valve body 11. The collar 68 which carries the pin 69 lends reinforcing support to the pin to preclude damage to the pin notwithstanding the application of excessive rotational force to the stem 14 through the operating arm 17. The pin 69 or similar stop means can, in an alternative configuration, be also used to provide a limit of movement in the second direction "B" of the stem 14 in cases where it is not desirable to provide the limit of movement by shoulder 63 and surface 64 within the valve chamber. In this case the pin 69 will engage a shoulder in the upper portion of bonnet 13 to provide a limit of movement in direction "B".

As shown in FIG. 5, the rotary valve member 12 is at its second limit of travel in the second direction and arranged for decreased seal engagement with the sealing rings 33 and 34. In this position, the stop shoulder 63 of cover 13 is engaged with the flange surface 64 of the stem 14.

As shown in FIG. 6, the rotary valve member 12 is at its first limit of travel with the rotary valve member 12 being in tight seal engagement with the sealing rings 33 and 34. Also, as previously explained, the sealing rings 33 and 34 are in tight seal engagement with the seal support rings 27 and 28.

In operation when it is desired to operate the ball valve unit, and assuming that the ball valve unit is in its opened condition and in tight seal engagement with the sealing rings as shown in FIG. 1, the operating arm 16 is first rotated in a counterclockwise direction from the position shown in solid lines in FIG. 3 to the position shown in dashed lines. At this point, the rotary valve 12 will assume the position within the valve body as shown in FIG. 4. Next, operating arm 17 is rotated in a clockwise direction from the first rotational limit as shown in FIG. 2 to the second rotational limit such that the rotary valve member 12 assumes the position within the valve body 11 as shown in FIG. 5. Because the rotary valve member 12 was moved in the second direction for decreased seal engagement with the sealing rings 33 and 34, the operating arm 17 was rotatable between the open condition of rotary valve 12 as shown in FIG. 4 to its closed position as shown in FIG. 5. After the rotary valve is closed, operating arm 16 is then rotated in a clockwise direction from the dashed line position indicated in FIG. 3 to the solid line position. Rotating the operating arm 16 in a clockwise direction causes the rotary valve 12 to move in the first direction for once again assuming tight seal engagement with the sealing rings 33 and 34 as shown in FIG. 6.

For operating the ball valve unit from the closed position as shown in FIG. 6 to the open position as illustrated in FIG. 1, the foregoing procedure is performed in a reversed sequence. First, the operating arm 16 is rotated in the counterclockwise direction until the rotary valve member 12 is moved in the second direction and to its second limit of travel as shown in FIG. 5. Thereafter, operating arm 17 is rotated in a counterclockwise direction from the dashed line position shown in FIG. 3 to the solid line position until the pin 69 engages surfaces 71 defined by the slotted portions 70 of cover 13. At this point in time, the rotary valve member is in its opened position and in decreased seal engagement with the sealing rings 33 and 34. Finally, operating arm 16 is rotated clockwise from the dashed line position shown in FIG. 3 to the solid line position to impart movement to the rotary valve in the first direction until the first limit is reached whereat the rotary valve member 12 is once again in tight seal engagement with the sealing rings 33 and 34.

From the foregoing, it can be appreciated that the present invention provides a new and improved ball valve unit of the type which incorporates a rotary valve member. Because the tight seal engagement between the rotary valve member and the other sealing components is assured when the rotary valve member is in the open or closed position, the flow of the fluid product which the valve controls, into the valve chamber and between critical sealing areas is precluded. As a result, the erosion, abrasion, and corrosion associated with such a condition is prevented and thus, the useful life of the ball valve unit of the present invention may be extended over a longer operating life than heretofore possible with other such ball valve units. Also, the movement of the rotary valve member in the second direction may be limited so that a slight contact between the rotary valve member and the sealing rings and other sealing components is maintained during operation of the valve for obvious beneficial reasons.

The ball valve unit of the present invention also provides a means by which fluid product may be flushed from the valve chamber around the rotary valve member and from the rotary valve member through bore when in the closed position. To that end, and referring once again to FIG. 1, the cover 13 includes a port 73 which communicates with a recess 74 within the cover. The recess 74 in turn communicates with the valve chamber 18 of the valve body. The valve body also includes an external port 75 which communicates with the bottom portion of the valve chamber commonly referred to as the outer chamber. In those instances where the ball valve unit of the present invention is being used to control the flow of fluid which solidifies upon cooling, steam or other fluid at an elevated temperature may be introduced into port 73 for the purpose of flushing any fluid product which may have accumulated on the rotary valve member and within the through bore of the rotary valve member when in the closed position. Hence, blockage of the fluid passage in the rotary valve member due to cooling of the fluid product is precluded and operability of the valve is maintained.

Also, as a consequence of the port 75 in the body 11, seal leaks may be detected. All that is necessary is to open the port 75 to observe whether the fluid which is being controlled drips from the port. Such a condition would indicate that one of the seals is leaking. Collecting the fluid and measuring its volume over a period of time may be performed to determine the extent of the leak for the purpose of forming a basis as to whether one or more of the seals require replacement.

Lastly, by virtue of the outer chamber and port 75, intermingling of fluids controlled by the valve may be precluded. For example, should gasoline be at one side of the valve and kerosene at the other side of the valve in manifold piping of two or more tanks, and should there be a leak in one of the seals when the rotary valve member is in the closed position, the port 75 may be opened to flush the leaked fluid from the valve and thus prevent the inadvertent mixing of the two fluids.

As a result of the foregoing, the present invention provides a ball valve unit which may be utilized in various applications for controlling various forms of fluid. The valve as illustrated is of a single trunnion type mounting, which is satisfactory for many operations. However, where the valve size is large and high pressures are encountered, it is contemplated that a second stem and packing might be used for the bottom of the rotary valve member, thus providing a double trunnion mounted ball member. The ball valve unit of the present invention not only provides a maximum fluid tight seal between the rotary valve member and the other sealing components, but additionally, provides a means by which fluid products may be flushed from the valve chamber in either open or closed position of the valve. Furthermore, fluid which would otherwise solidify upon cooling may be maintained in the liquid state while the valve is in its closed position by utilizing the ports 73 and 75 as a circulating system. Furthermore, intermingling of two different fluids is precluded which would otherwise occur due to a leak in one of the seals by utilizing the port 75 as a drain.

While a particular embodiment of the present invention has been shown and described, modifications may be made, and it is intended in the appended claims to cover all such modifications which fall within the true spirit and scope of the invention.

The invention claimed as follows:

1. A flushable ball valve unit for high pressure fluid control comprising: body means defining a valve chamber including a pair of passages having respective openings communicating with said valve chamber and adapted for connection to a service line; seal support means comprising substantially flat annular surfaces about said passage openings into the valve chamber, said surfaces converging in a first direction; rotary ball means within said valve chamber including a through bore for connecting said passages when said ball means is in the valve open position; annular seal means disposed between said seal support means and said rotary ball means for establishing a fluid seal therebetween; port means formed in said body means providing a circulating system for flushing said chamber around said rotary ball means; means for rotating said rotary ball means between a valve open and a valve close position comprising stem means connected with said ball and supported by said body means for rotative movement; and operating means coupled to said stem means for moving said stem means and correspondingly said rotary ball means and said seal means in said first direction to a first, seated position, said seal means moving relative to said converging seal support surfaces with the converging nature of said surfaces forcing said seal means into firm sealing contact with said ball means and said surfaces, said operating means also being operable to move said stem means, ball means and seal means in a second direction opposite said first direction for movement of said ball to a second, unseated position thereby decreasing the sealing contact, such that movement from the seated position can be employed prior to rotative movement of the ball means thereby facilitating said rotative movement, with movement back to the fully seated position being effected once the desired rotative position of the ball means is attained; and said seal means being formed of a non-yieldable material, with said stem means being rigidly affixed to said ball means to preclude relative movement therebetween, such that when said ball means is in the valve closed, fully seated position, said ball means is precluded from movement axially with repect to said passages under the influence of high line pressure, thereby insuring the continuity of the sealing engagement and preventing line fluid from entering said chamber, such that flushing of said valve chamber can be accomplished without mixing the flushing medium and the fluid product in the service line.

2. A ball valve as defined in claim 1 wherein said body means includes a body member and a cover, said port means including a first port formed in said cover and a second port formed in said body member.

3. A valve according to claim 2, further including a recess communication with said valve chamber, said cover port, cover recess, and body port forming a circulating system about said rotary valve means.

4. A ball valve unit as defined in claim 1, wherein said body means further comprises a cover, said operating means including an inner threaded portion, on said cover, said stem means, extending through said cover, and a gland member axially fixed to said stem, but rotatable thereto and including an external threaded portion engaged with said cover inner threaded portion, such that rotation of said gland member with impart axial movement to said stem means and said rotary ball means in said first and second directions.

5. A ball valve unit as defined in claim 4 further including stop means for limiting the degree of movement of said stem means and said rotary ball means in said second direction.

6. A ball valve unit as defined in claim 5 wherein said stop means comprises a shoulder portion on said cover and an annular shoulder portion on said stem, said shoulder portions being arranged to abut at the maximum limit of movement of said rotary ball means in said second direction.

7. A ball valve unit as defined in claim 4 further including a first operating arm coupled to said stem means for rotating said rotary valve means between the valve open position and the valve closed position, and a second operating arm coupled to said threaded gland member for operation thereof to move said ball means between the seated and unseated positions.

8. A ball valve unit as defined in claim 7 further including rotary stop means carried by said stem means for limiting rotational movement of said rotary ball means between a fully open position at one limit, and a fully closed position at the other limit.

9. A ball valve unit for high pressure fluid control comprising: body means defining a valve chamber including a pair of passages having respective openings communicating with said valve chamber and adapted for connection to a service line; rotary ball means within said valve chamber including a through bore for connecting said passages when said ball means is in the valve open position; sealing means engaged with said rotary ball means and said body means, said sealing means being responsive to movement of said ball means in a first direction transversely of said passages for increasing the sealing contact with said ball member and said body means for rotating said rotary ball means between a valve open and a valve close position comprising stem means connected with said ball and supported by said body means for rotative movement; and operating means coupled to said stem means for moving said stem means and correspondingly said rotary ball means in said first direction to a first, seated position for said sealing to achieve firm sealing contact with said ball means and said body means, said operating means also being operable to move said stem means and ball means in a second direction, opposite said first direction for movement of said ball to a second, unseated position thereby decreasing sealing contact, such that movement from the seated position can be employed prior to rotative movement of the ball means thereby facilitating said rotative movement, with movement back to the fully seated position being effected once the desired rotative position of the ball means is attained; and said seal means comprising a pair of seal members formed of a non-yieldable material one said seal member being disposed the respective openings of said passages into said valve chamber and being in engagement with said ball means, and said stem means being rigidly affixed to said ball means to preclude relative movement therebetween, such that when said ball means is in the valve closed fully seated position, said ball means is precluded from movement axially with respect to said passages under the influence of high line pressure, thereby insuring the continuity of the sealing engagement and preventing line fluid from entering said chamber.

10. A ball valve according to claim 9, further including port means in said body means, such that when said ball means is in the fully seated valve closed position, a liquid medium may be employed to flush said valve chamber without mixing of said liquid medium and the fluid product in the service line.

* * * * *

UNITED STATES PATENT AND TRADEMARK OFFICE
CERTIFICATE OF CORRECTION

PATENT NO. : 4,203,460
DATED : May 20, 1980
INVENTOR(S) : Werner K. Priese

It is certified that error appears in the above-identified patent and that said Letters Patent are hereby corrected as shown below:

Column 1, line 25, change "owning" to --owing--;

Column 12, line 39, after first occurrence of "means" insert --formed--.

Signed and Sealed this

Ninth Day of September 1980

[SEAL]

Attest:

SIDNEY A. DIAMOND

Attesting Officer

Commissioner of Patents and Trademarks